Aug. 21, 1951  W. D. VAN ZELM ET AL  2,565,007
NOSE LANDING GEAR
Filed Dec. 19, 1946  4 Sheets-Sheet 1

Inventors
WILLEM D. VAN ZELM,
JOSEPH SHELESKI,

By Donald W. Farrington
Attorney

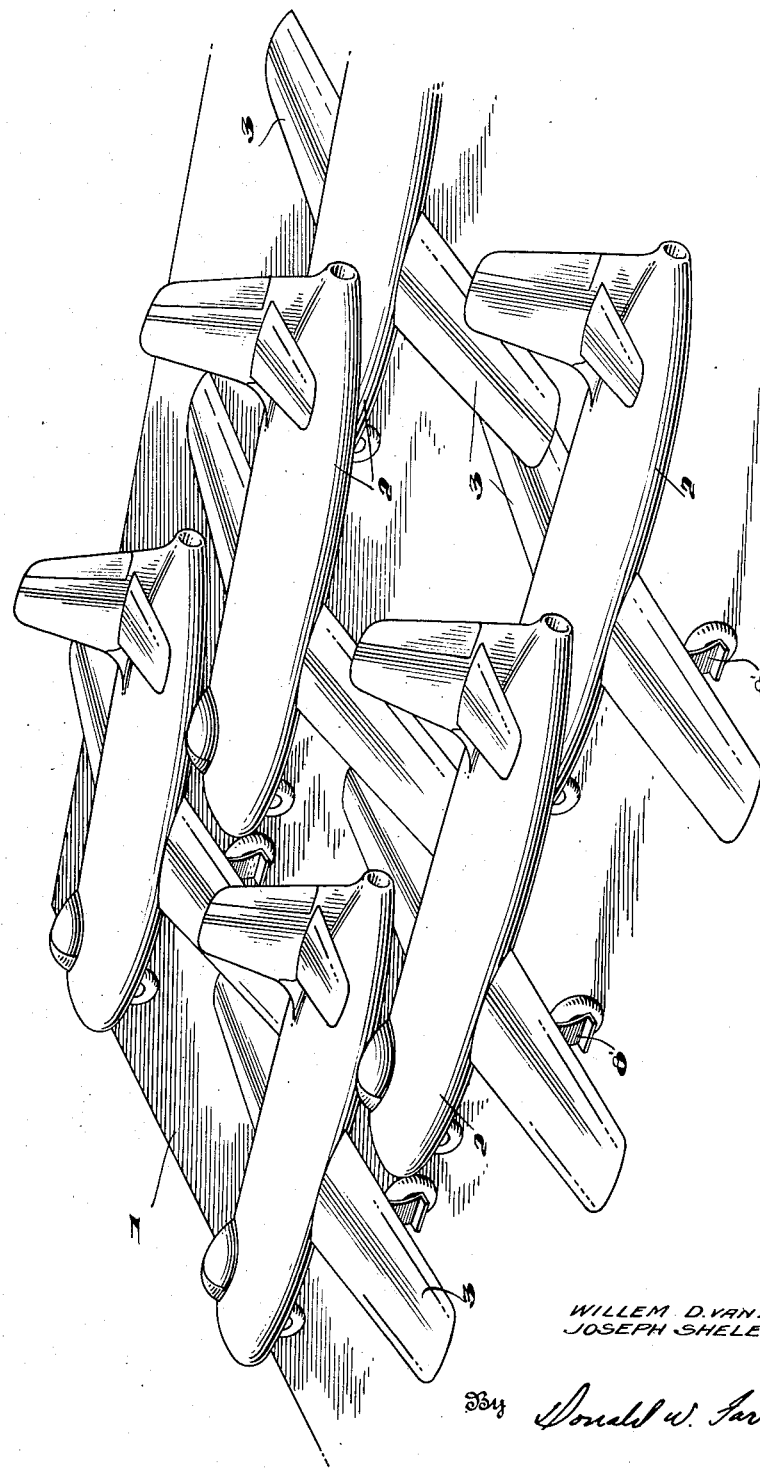

Aug. 21, 1951 W. D. VAN ZELM ET AL 2,565,007
NOSE LANDING GEAR
Filed Dec. 19, 1946 4 Sheets-Sheet 3
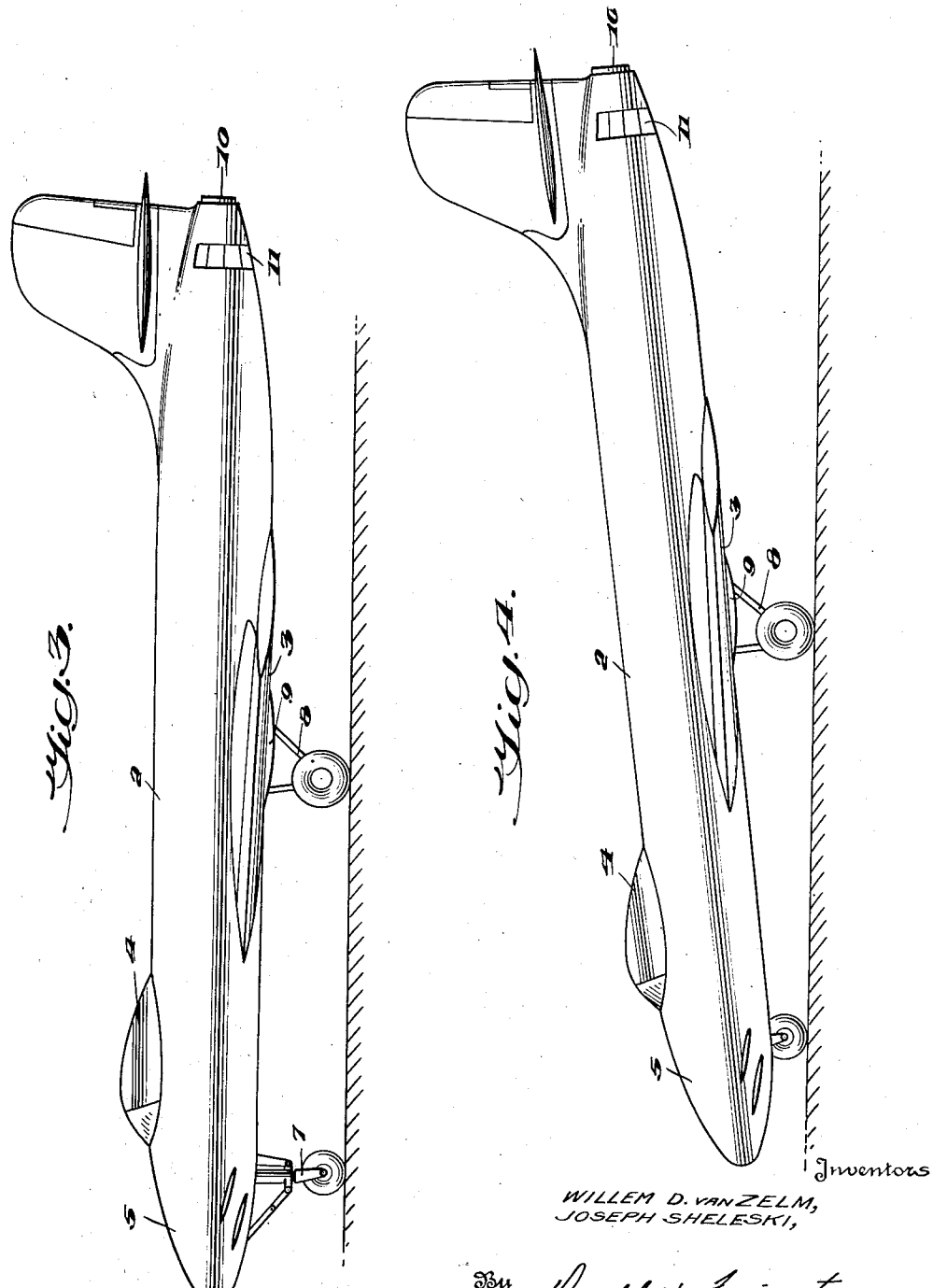
Inventors
WILLEM D. VAN ZELM,
JOSEPH SHELESKI,
By Donald W. Farrington
Attorney

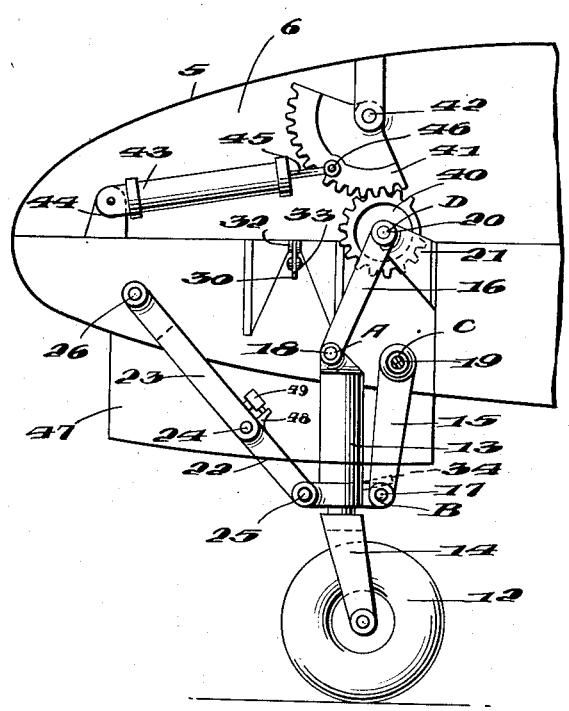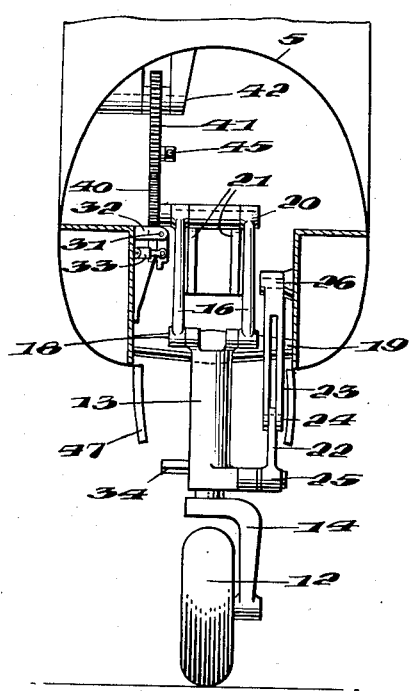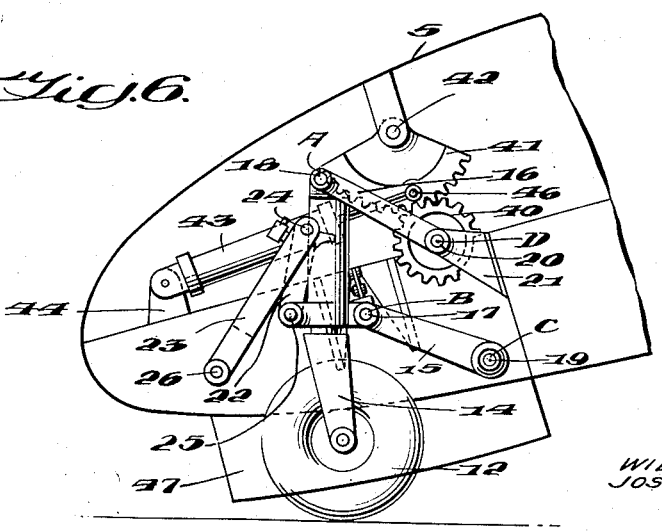

Patented Aug. 21, 1951

2,565,007

UNITED STATES PATENT OFFICE 2,565,007

NOSE LANDING GEAR

Willem D. van Zelm, Ruxton, and Joseph Sheleski, Baltimore, Md., assignors to The Glenn L. Martin Company, Middle River, Md., a corporation of Maryland Application December 19, 1946, Serial No. 717,206

6 Claims. (Cl. 244—102)

This invention relates to a novel landing gear structure, particularly adapted for use on jet propelled airplanes. Jet propelled airplanes have an additional problem over conventional type airplanes, in that the blast from the jet is much more hazardous than the backwash from the propellers. For this reason, it is very difficult to run a jet engine on the ground for warm-up, adjustment or maintenance without elaborate precautions. When jet fighters are used on an aircraft carrier, it is desirable to have as many fighters positioned on the deck prior to take-off as possible, and it is also necessary to start the engines and run them prior to take-off. Both conditions on a carrier are possible by use of this invention.

A jet propelled airplane has landing gear which usually consists of two main landing gear and a nose gear, so that the fuselage is maintained in substantially horizontal position for take-off and landing. By this invention, it is possible to construct the nose landing gear so that, in conjunction with the main landing gear, the nose gear may be partially retracted to some intermediate position where the fuselage may be supported on the ground with the jet exhaust pointed rearwardly and upwardly. In this position, the airplanes may be arranged with considerable economy of space, with the additional advantage that the jet power plants may be started and run without any danger to other airplanes or structure that would normally be endangered by the exhaust of the jet if the fuselage were maintained in the normal horizontal position.

It is an object of this invention to provide a structure that will permit the nose landing gear strut to be positioned intermediate the extended and retracted position, so that the fuselage can be maintained at an angle above the horizontal.

It is a further object of this invention to provide an improvement in landing gear structure whereby the fuselage aft of the main landing gear is tilted upwardly to effect an economy of space in stowing airplanes, either on an aircraft carrier or in a hangar.

It is another object of this invention to provide improved landing gear structure to direct the fuselage, including a jet power plant, at an angle above the horizontal so that the power plant may be run without endangering adjacent structure and personnel.

It is a further object of this invention to provide a latching mechanism to maintain the nose landing gear of any tricycle landing gear in an intermediate position to control the position of the fuselage of the airplane with respect to the ground.

Further and other objects of this invention will become apparent from the description of the accompanying drawings which form a part of this disclosure and in which like numerals refer to like parts.

In the drawings:

Figure 2 is a perspective view showing the arrangement of airplanes.

Figure 3 is a profile view showing the landing gear supporting the airplane in the normal take-off position.

Figure 4 shows the airplane with the nose landing gear partially retracted.

Figure 5 is a fragmentary sectional view of the nose gear strut and supporting linkage in the extended position.

Figure 6 is a fragmentary sectional view of the gear shown in Figure 5 in the partially retracted position.

Figure 8 is a transverse sectional view through the fuselage showing the gear in the extended position.

Figure 1:
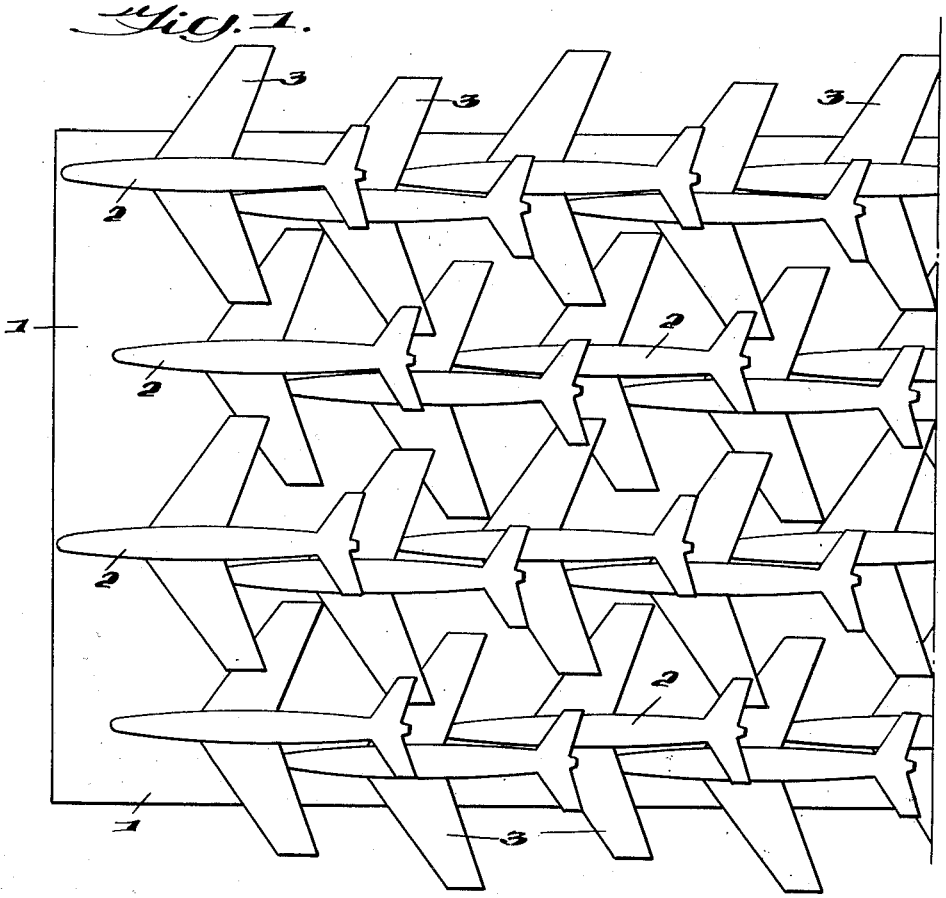
Figure 1 is a plan view showing a possible arrangement of aircraft stowed in accordance with this invention.

Airplanes embodying this invention are shown stowed in a relatively small space in Figures 1 and 2. Due to the tilt of the fuselage, it is possible to stow a large number of planes in the small space indicated as 1, which may be an aircraft carrier deck or the limitations of hangar space. The nose of the fuselage 2 is sufficiently lowered by the partial retraction of the nose landing gear that it can extend under either wing 3 of the forward airplane, and the rear end of fuselage 2 will extend over the wing of the rearwardly disposed airplane. By staggering the longitudinal arrangement of the fuselages, it is possible to run the jet engines prior to take-off with a minimum of hazard to adjacent structure and personnel.

A typical fighter airplane embodying the invention is shown in Figures 3 and 4. The airplane consists of the fuselage 2, and wings 3 having a canopy 4 covering the pilot cockpit. The nose 5 of the fuselage contains a nose wheel well 6 for the stowage of the nose landing gear 7. Main landing gear 8 are arranged pivotally supported in the root section of the wing so that they may be hinged inwardly and the strut housed in the wing structure as the main landing gear wheel is pivoted to a position within wheel well 9 located in the fuselage. This is necessary because the high speed, thin wings do not afford sufficient space for the stowing of the main landing gear wheel. The fairing cover 8', normally secured to move with the main landing gear strut, shown in Figure 2, is omitted from Figures 3 and 4 for clarity. Power plant 10 is arranged in the fuselage with the exhaust directed rearwardly therefrom. Dive brakes 11 are located on the rear end of the fuselage or around the periphery of the fuselage at the side of power plant 10.

The nose gear, shown in the extended position in Figure 5, consists of tire and wheel 12, oleo strut 13 and wheel fork 14 casterably mounted in strut 13. Oleo strut 13 provides one link of a multi-bar linkage, including links 15 and 16 pivoted to strut 13 at 17 and 18. The other end of link 15 is pivoted at 19 to the fuselage structure, and link 16 is pivoted at 20 to bracket 21 secured to the fuselage structure. A drag strut includes linkages 22 and 23 pivoted together at 24 with the ends pivoted at 25 and 26 to the oleo strut and fuselage structure, respectively.

The drag strut affords a brace for the landing gear in the extended position by having sections 22 and 23 aligned slightly over dead center. The landing gear is maintained in the retracted position by the same alignment of the drag strut portions 22 and 23. Projection 48 is rigidly secured to portion 22 as a bell crank, and hydraulic cylinder 49 is interconnected in the hydraulic system to break the drag strut as hydraulic pressure is applied to the cylinder prior to extending or retracting the landing gear.

Figure 7:
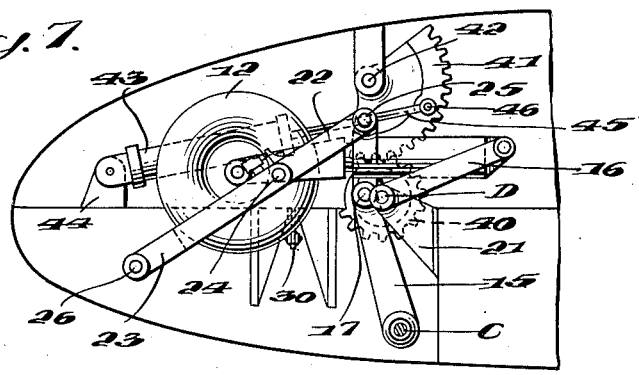
Figure 7 is a fragmentary sectional view of the gear shown in Figure 5 in the full retracted position.

With the proper selection of linkage arms, the nose gear will move from the extended position shown in Figure 5 to the intermediate position shown in Figure 6 and finally to the stowed position shown in Figure 7.

Linkage AB is slightly longer than AD or BC. The linkage BC is substantially equal to the distance DC. Pivot B, if allowed to rotate in an arc, would pass through pivot D. Pivot B never reaches pivot D because linkage AB is the longest arm and pivot A is restrained by linkage AD. Point A follows the arc described by linkage AD, and linkage AB, or the landing gear cylinder, swings into a horizontal position within the fuselage. Members 22 and 23, forming the drag strut, are again aligned to lock the gear in the stowed position.

The nose landing gear is locked in the intermediate position by latch 30 pivoted at 31 to bracket 32. Hydraulic cylinder 33 actuates latch 30 to engage and disengage stop 34 on strut 13. In this intermediate position, the fuselage is tilted upwardly to the rear so that the planes may be stowed in small areas or so that the jet engines may be run safely. For take-off, the landing gear is extended to the position shown in Figure 5. After take-off, the gear is rotated within the fuselage to the position shown in Figure 7. The drag strut locks the gear in the down position (Figure 5) or the up position (Figure 7). Latch 30 locks the gear in the intermediate position.

Any means may be provided to actuate the landing gear and by way of example, the landing gear is shown operated by two gear segments and a cylinder. Gear segment 40 is affixed to the shaft at pivot 20 and moves with linkage 16. Gear segment 41 is pivoted at 42 and drives gear segment 40. Fluid actuated cylinder 43 is secured to the airplane structure at 44 and has strut 45 pivoted to gear segment 41 at 46.

When the plane is about to land, the hydraulic system, or any equivalent control system, is energized to open the doors 47 of wheel well 6, and the hydraulic cylinder will rotate gear segment 41 and gear 40 to extend the landing gear to the position shown in Figure 5, where it will be locked in place by the drag strut. After landing, when it is desired to tilt the fuselage for the purposes described above, the hydraulic fluid may be by-passed from one side of the piston to the other, after the drag strut has been broken, to permit the weight of the airplane to cause a partial retraction of the landing gear until latch 30 contacts stop 34. The fuselage will then be tilted upwardly to the rear while the airplane is supported on the tricycle landing gear. For take-off, hydraulic cylinder 43 is energized to extend the landing gear to the position shown in Figure 5, and after take-off, cylinder 43 is energized to fully retract the landing gear to the position shown in Figure 7. Latch 30 is retracted to permit the full retraction of the landing gear. It will be noted that for the extended and intermediate positions of the nose gear, strut 13 is maintained in a substantially vertical position by the supporting linkages, so that the gear will castor for either position to permit maneuvering of the airplane.

It is to be understood that certain changes, alterations, modifications and substitutions can be made without departing from the spirit and scope of the appended claims.

We claim as our invention:

1. In a jet-powered airplane having main landing gear and a nose gear to support the airplane on the ground with the fuselage in a generally horizontal position when said gear is extended, said nose gear including a wheel and strut assembly, a linkage member pivotally secured on one end adjacent the top of said nose gear strut and pivotally secured on the other end to the airplane structure, a second linkage member approximately equal to said first linkage member having one end pivotally secured adjacent the lower end of said nose gear strut and the other end pivotally secured on said airplane structure, said pivot points on said aircraft structure being spaced approximately equal to the spacing of the other ends of said linkages along said strut, so that a generally quadrilateral support for said strut is obtained, said linkage members supporting said strut in a generally vertical position at all times when said nose gear is supporting said airplane on the ground, the sides of the quadrilateral arrangement of the strut linkage and fuselage being so proportioned that the distances between pivots on the second mentioned linkage and the strut together are slightly longer than the sum of the distances between the pivot points on the fuselage and on said first mentioned linkage member so that as the pivotal connection of said second linkage on said strut approaches said pivotal connection of said first linkage member on the fuselage, said pivotal connection of said second linkage member on said strut forms a pivot point about which said strut turns from the vertical to a horizontal stowed position.

2. In a jet-powered airplane having main landing gear and a nose gear to support the airplane on the ground with the fuselage in a generally horizontal position when said gear is extended, said nose gear including a wheel and strut assembly, said wheel being mounted to turn freely about the longitudinal axis of said strut, a linkage member pivotally secured on one end adjacent the top of said nose gear strut and pivotally secured on the other end to the airplane structure, a second linkage member approximately equal to said first linkage member having one end pivotally secured adjacent the lower end of said nose gear strut and the other end pivotally secured on said airplane structure, said pivot points on said aircraft structure being spaced approximately equal to the spacing of the other ends of said linkages along said strut, so that a generally quadrilateral support for said strut is obtained, said linkage members supporting said strut in a generally vertical position at all times when said nose gear is supporting said airplane on the ground, the sides of the quadrilateral arrangement of the strut linkage and fuselage being so proportioned that the distances between pivots on the second mentioned linkage and the strut together are slightly longer than the sum of the distances between the pivot points on the fuselage and on said first mentioned linkage member so that as the pivotal connection of said second linkage on said strut approaches said pivotal connection of said first mentioned linkage member on the fuselage, said pivotal connection of said second linkage member on said strut forms a pivot point about which said strut turns from the vertical to a horizontal stowed position.

3. In an airplane having a main landing gear and a nose gear, said nose gear including a wheel and wheel strut assembly, said wheel being mounted to turn freely about the longitudinal axis of said strut, a pair of linkages having one end of each linkage pivotally secured in spaced relation on said strut, and the other ends of said linkages being individually pivoted in spaced relation to normally fixed portions of said airplane, said linkages being swingable about their pivotal connections with said airplane to retract said wheel and wheel strut assembly, said linkages and pivot points being so arranged that said strut will be maintained in a generally vertical castering position for all positions of said nose gear while supporting the airplane on the ground, a two part drag strut pivoted at the center having one end pivoted adjacent the lower end of said wheel strut and the other end pivoted on the airplane structure, said portions of the drag strut being aligned when said gear is extended to stabilize the gear in said extended position, said portions of the drag strut being folded for intermediate positions until the full retracted position of said gear is reached, and said portions of the drag strut being aligned in the full retracted position to stabilize the gear in this position.

4. In an airplane having jet propulsion means arranged to discharge rearwardly relative thereto, main landing gear located aft the center of gravity thereof and nose landing gear located forward of the center of gravity thereof, all said landing gear being carried by said airplane for movement between fully extended position, wherein the airplane is supported in a generally horizontally position on the ground for landing and take-off, and fully retracted position for stowage during flight means for extending and retracting said landing gear, and releasable latch means mounted on said airplane for selectively engaging said nose gear in an intermediate partially retracted position and for holding said nose gear in such partially retracted position while said main gear is fully extended, whereby said airplane will be supported in a rearwardly and upwardly inclined position relative to the ground to direct the discharge from said jet propulsion means upwardly and rearwardly.

5. In an airplane having jet propulsion means arranged to discharge rearwardly relative thereto, retractable main landing gear located aft the center of gravity and a retractable nose gear forward of the center of gravity, said gear when fully extended adapted to support said airplane on the ground in a normal, generally horizontal position, said nose gear comprising a wheel, and supporting and retracting mechanism therefor movably connecting said wheel to said airplane and operable to move said wheel between fully extended and fully retracted position, said mechanism including means for locking said wheel in either said position, and a separate releasable latch means carried by said airplane adjacent said nose gear and adapted to selectively engage said mechanism for holding said wheel in an intermediate partially retracted position wherein said airplane will be supported in a rearwardly and upwardly inclined position relative to the ground to direct the discharge from said jet propulsion means upwardly and rearwardly.

6. In a jet-powered airplane having retractable main landing gear located aft the center of gravity and a retractable nose gear forward of the center of gravity, said gear when fully extended adapted to support said airplane on the ground in a normal, generally horizontal position, said nose gear comprising a wheel, a strut, means supporting said wheel for castoring about a predetermined castor axis relative to said strut, means swingably supporting said strut from said airplane and operable to shift said strut and nose wheel from fully extended to fully retracted position within the airplane, means for selectively holding said wheel and strut in a predetermined partially retracted position wherein said airplane will be supported on the ground in a rearwardly and upwardly inclined position, said strut supporting means being so related to said strut and said airplane as to swing said strut relative to said airplane during movement of the nose gear from said fully extended to said partially retracted position through an angle substantially equal to the angle of inclination of said airplane when said strut is thus partially retracted, whereby the castor axis is maintained at substantially the same angle relative to the ground when said nose gear is in either said fully extended or said partially retracted position.

WILLEM D. van ZELM.
JOSEPH SHELESKI.

REFERENCES CITED

The following references are of record in the file of this patent:

UNITED STATES PATENTS

| Number | Name | Date |
|---|---|---|
| 1,716,439 | Gray | June 11, 1929 |
| 2,014,777 | Payne | Sept. 17, 1935 |
| 2,323,640 | Armstrong | July 6, 1943 |
| 2,333,981 | Bridges | Nov. 9, 1943 |
| 2,405,651 | Height | Aug. 13, 1946 |
| 2,467,898 | Longepierre | Apr. 19, 1949 |

FOREIGN PATENTS

| Number | Country | Date |
|---|---|---|
| 505,263 | Great Britain | May 4, 1939 |
| 814,014 | France | Mar. 8, 1937 |